United States Patent Office 3,330,740
Patented July 11, 1967

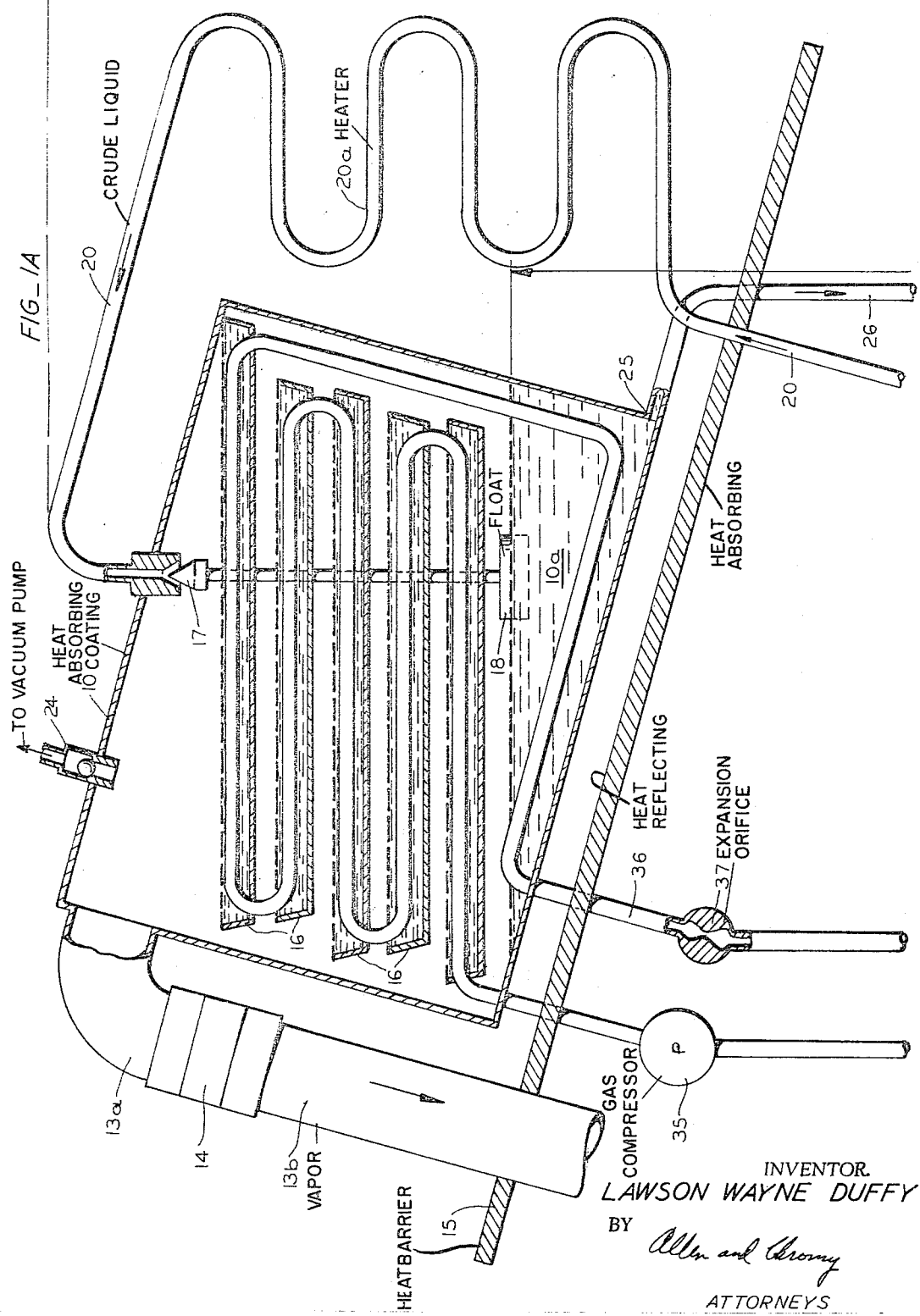

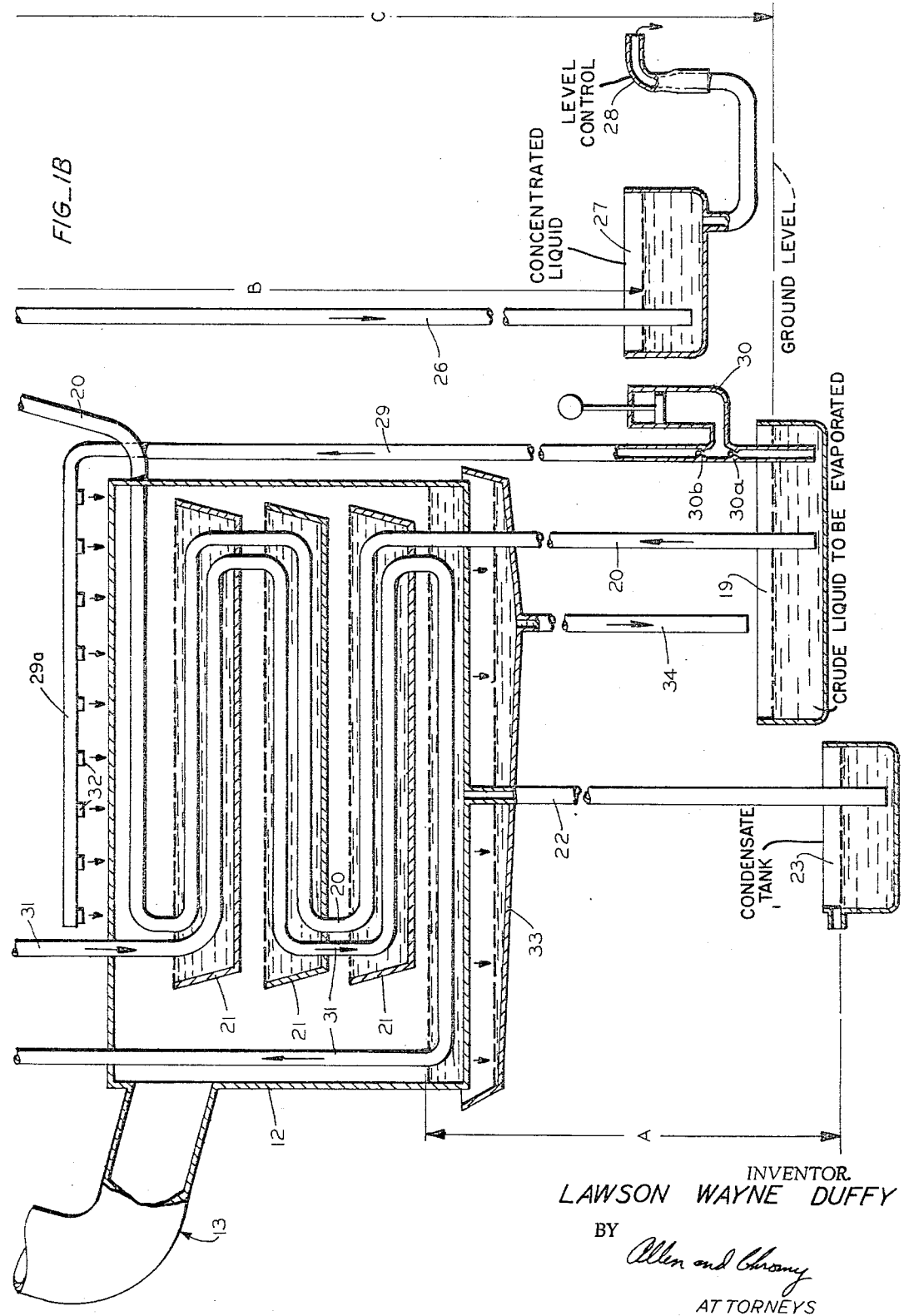

3,330,740
APPARATUS FOR SOLAR DISTILLATION
OF LIQUIDS
Lawson Wayne Duffy, 640 Meadow Ave.,
Santa Clara, Calif. 95051
Filed Feb. 3, 1964, Ser. No. 342,185
5 Claims. (Cl. 202—180)

My invention pertains to apparatus and methods for the efficient and economical distillation of liquids with emphasis on the demineralizing of sea water. An alternate purpose of this invention is for the concentration or dehydration of fluids at relatively low temperatures by the removal of the water therefrom.

Although there are many highly efficient distillation methods of public knowledge, most if not all of these methods are not economically practical due either to limited volume, high initial cost, intermittent operation, high maintenance and replacement costs, prohibitive space requirements, or a combination of these factors. These factors have been considered in the development of my invention in order to provide an apparatus that is efficient consistent with true economy.

It is well established that water and most other liquids will boil or vaporize at any temperature above their freezing or solidifying point, providing that the pressure upon the liquid is such as to permit molecules of the liquid to readily expand to the gaseous state. This principle is employed through the use of barometric feed and outfall lines to induce and maintain a static low pressure within the evaporator and condenser portions of this apparatus.

The pre-heater section of this apparatus is normally intended to be heated by solar energy, preferably from a large mass of heat absorbing material. Due to the relatively low temperature requirement, low yield or semi-expended atomic reactors may be employed as a source of energy for the pre-heater section. Other more conventional fuels may be used to augment the above sources.

It is therefore an object of this invention to provide an improved distillation apparatus and method in which there is provided an evaporator chamber supported at an altitude to which crude liquid is elevated by atmospheric pressure as said liquid is required; said chamber is heated by solar energy, and the vapor therefrom is supplied to a condenser chamber in which the product liquid is condensed and from which the accumulating product liquid is dropped against atmospheric pressure to the product liquid reservoir. Furthermore, a heat pump system is provided between the boiler chamber and the condenser chamber so that this distillation apparatus continues to function during the night on a twenty-four hour basis.

Other and further objects of this invention will be apparent to those skilled in the art to which it relates from the following specification, claims and drawing.

Referring to the drawing briefly:

FIG. 1a is a view partially section of the part of this apparatus including the evaporation chamber; and FIG. 1b is a view partially in section of the part of this apparatus including the condensing chamber and the various pipes broken off at the top of this view are intended to be continuations of similar pipes shown broken off at the bottom of FIG. 1a.

Referring to the drawing in detail, reference numeral 10 designates a tilted reactor or boiler chamber which is tilted so as to provide a sump portion 10a in the lower part thereof. Chamber 10 is connected to the condenser chamber 12 by the relatively large connecting duct 13. This connecting duct is of circular cross section and is made in two sections 13a and 13b connected by an insulating sleeve 14 to limit heat conductively from the duct section 13a to section 13b. A reflector heat shield 15 is positioned between chamber 10 and chamber 12 to act as a heat barrier between the chambers and reflect heat to the boiler or evaporator chamber 10. This heat shield 15 may be provided with a heat reflecting layer or layers on the top thereof, and below these reflecting layers there may be provided a thick layer of asphalt or the like for absorbing solar heat which is to be reflected therefrom by the reflecting layers to the evaporator chamber 10. Furthermore, insulating material may be provided on the under side of the heat shield 15 to further reduce heat passing therethrough to the condensing chamber 12.

The evaporator chamber 10 is preferably made of a cylindrical tubular cross section and is provided with a plurality of trays 16 which are supported level therein one above the other. The liquid inlet to the evaporating chamber 10 is controlled by a valve 17 which is operated by the float 18. This inlet is connected by the pipe 20 to the crude liquid reservoir 19 that is positioned on or below the surface of the earth. An evacuation check valve 24 is provided to the top of evaporation chamber 10, and this check valve outlet may be connected to the inlet of an evacuating pump (not shown).

The condenser unit comprises a cylindrical chamber 12 that is similar to the boiler chamber 10 and a plurality of level trays 21 is provided therein to increase the condensing surface area. The pipe 20 through which crude liquid is supplied to the evaporating chamber 10 also passes through the condensing chamber 12 and sections of this pipe are positioned in the trays 21 so that heat is transferred to these pipe sections from the water or other liquid accumulated in these trays and, as a result, the inlet liquid fed to the evaporating chamber 10 is preheated. The inlet liquid may also be additionally preheated by passing it through the preheater field 20a which is positioned above the heat barrier and reflector shield 15.

The heavier residual liquid which, in the case of ocean water, is distilled in the evaporation chamber 10, will contain the various salts and minerals dissolved in the ocean water and is collected in the lower part 10a of the evaporating chamber 10. This lower part of chamber 10 is provided with an outlet 25 which is connected to the pipe 26 and the outlet end of this pipe is positioned in the reservoir 27. This reservoir is provided with an outlet pipe which is connected to the bottom thereof. The outfall 28 of this pipe is adjustable in height with reference to the reservoir 27 so that the level of liquid in the reservoir is maintained at a certain level, determined by the elevation of the outfall.

The condenser chamber 12 is cooled by water supplied from the crude liquid reservoir 19. The cooling liquid is sprayed over the top of chamber 12 from a plurality of outlet jets 32 provided to the manifold 29a. This manifold is connected to the pipe 29 and pump 30 which is operated by a motor (not shown) and is provided with conventional inlet and outlet valves 30a and 30b, respectively, so that liquid drawn into this pump from the reservoir 19 through inlet check valve 30a is forced up through outlet check valve 30b and pipe 29 to the manifold 29a. The cooling liquid sprayed over the condensing chamber 12 that flows down on the sides of this chamber drops to the collector sump 33 and from this sump drains through the pipe 34 which is connected to the bottom of a sump. This liquid is collected in reservoir 19 and also serves to heat the liquid in this reservoir.

Chambers 10 and 12 are at elevations of approximately barometric pressure altitude for the fluids to be distilled. Based on data given in Handbook of Chemistry and Physics, this elevation for pure water is approximately 33.83 feet at sea level; however, for sea water this elevation is somewhat less—that is, 33.07 feet and depends upon the salt and mineral content of the water. In order for the chambers 10 and 12 to be positioned so that the heights A and B are approximately the same, these chambers may be positioned more or less side by side and suitable insulating material may be placed around chamber 12 to insulate it from solar heat. The height C is such that crude liquid is readily syphoned through the pipe 20 into the top of chamber 10 through the valve 17 when this valve is opened.

The operation of this device is as follows:

The heights A and B are assumed to be atmospheric pressure altitude for the fluids to be distilled, and height C to be syphoning elevation. The boiler 10, condenser 12 and connecting tube 13 are first evacuated by filling them with fluids from reservoir 19 so that all air therein is expelled through evacuation check valve 24. A suitable pump (not shown) may be attached to pipe line 20 for pumping liquid into chambers 10 and 12. When all air has been expelled from the chambers, the system is vented to atmospheric pressure at reservoirs 19, 23 and 27; thus atmospheric pressure will hold fluids at elevation levels A, B, and C, since the open bottom ends of pipes 20, 22 and 26 are positioned in the reservoirs 19, 23 and 27 respectively. Alternatively, the required low pressure may be produced in the chambers 10 and 12 by an aspirator or vacuum pump (not shown) attached to evacuation check valve 24.

With the system thus primed and the liquid temperatures in all parts of the system equal, the vapor pressures above the liquids will also be equal and no reaction will take place. As the liquid temperature in the boiler chamber 10 increases above that of the condenser chamber 12, due to the heat-absorbing coating on the outer surface thereof, and also due to the effect of the reflector heat shield, the liquid will boil until the vapor pressure above the liquid and its temperature are compatible. Since the liquid and its compatible vapor pressure in the condenser chamber 12 are lower than in the boiler chamber 10, the saturated vapor will flow from the boiler chamber to the condenser chamber and condense on the interior surfaces thereof and trays 21. The greater the temperature differential between the boiler chamber and the condenser chamber, the greater the flash vaporization will be in the boiler chamber, and such condition will continue at any temperature down to the freezing point of the fluid concerned.

As the liquid in the sump 10a of the boiler chamber vaporizes, the density of the residual fluid will increase to such an extent that its weight is great enough to cause it to drain down against atmospheric pressure to effluent reservoir 27. As the fluid level in sump 10a lowers, the float 18 opens valve 17 and allows crude liquid to be syphoned from the crude fluid reservoir 19 through the heat exchange tubes 20 immersed in the liquid in trays 21 in the condenser chamber 12. Since the input liquid is normally at a lower temperature than the product liquid in the condenser trays 21, much of the latent heat of vaporization which was given up in the condensation of the product liquid will be absorbed by the liquid in the heat exchange tubes 20. Additional heat will be absorbed from the preheater field 20a and the input liquid enters the boiler chamber in a heated condition with respect to the vapor pressure within the system. The additional heat absorbed will be transferred to the condenser unit as latent heat of vaporization. Some of this heat must be dissipated from the condenser unit to provide an adequate temperature differential between condenser and boiler units. Some of the latent heat is dissipated from the condenser unit by natural air flow around that section. Heat dissipation is further enhanced by an evaporization cooling system wherein water is lifted by pump 30 through the pipe 29 to manifold 29a and is expelled through jets 32 to saturate an absorbent mesh (not shown) covering the condenser chamber 12. As the water is evaporated into the surrounding air, heat is absorbed from the condenser chamber 12. Excess water running off of the chamber into sump 33 also absorbs heat and carries residual minerals from the collecting sump 33 to the crude water reservoir 19. The evaporation cooling system pump 30 can be electrically controlled by conventional means to provide operation when required to maintain temperature differential.

Although the basic concept as described above operates economically, it is limited to hours of direct sunlight. By adding the heat pump system, including the pump 35, pipes 36 in the trays 16 of chamber 10, throttle valve 37 and pipes 31 in the trays 21 of the condenser chamber, the system will operate continuously with very slight additional energy. In this system an aerosol is compressed by the pump unit 35 and the heat of compression is given up to the liquid in the trays 16 within the boiler chamber through tubes 36. The aerosol expands after passing through the throttle valve 37 and absorbs its latent heat of vaporization from the liquid in the trays 21 in the condenser chamber 12. This heat is cycled through the heat pump and, in turn, transferred to the boiler unit. This heat pump unit can be electrically controlled by a conventional thermostatically controlled circuit to provide automatic operation at any time when the temperature differential between boiler chamber and condenser chamber becomes less than the desirable spread, which is detected by suitable thermostats positioned in the boiler chamber and by controlling said circuit with this thermostat.

While I have shown a preferred embodiment of the invention, it will be understood that the invention is capable of variation and modification from the form shown so that its scope should be limited only by the scope of the claims appended hereto.

What I claim is:

1. Apparatus for continuously distilling crude liquid comprising an evaporation chamber at an elevation above the surface of the earth such that crude liquid will be raised thereto by atmospheric pressure, a condensing chamber, means connecting said condensing chamber to said evaporation chamber for transferring vapor from the evaporating chamber to the condensing chamber, means expelling the air from said chambers, a pipe connection between said evaporation chamber and a supply reservoir of crude liquid located on the surface of the earth, said pipe connection having a valve inside of said evaporation chamber, means actuated by the liquid in said evaporation chamber controlling said valve responsive to the level of crude liquid in said evaporation chamber to admit crude liquid upon a fall in level, and vice-versa, said evaporation chamber having a heat-absorbing coating whereby said chamber is heated at least part of the time with solar energy absorbed in said coating, a pipe connection between the bottom part of said evaporation chamber and a tank for residual liquid located on the surface of the earth so that the residual liquid drops to said tank when it is concentrated through said evaporation.

2. Apparatus for continuously distilling crude liquid comprising an evaporation chamber at an elevation above the surface of the earth such that crude liquid will be raised thereto by atmospheric pressure, a condensing chanmber, means comprising a pipe connecting said condensing chamber to said evaporation chamber for transferring vapor from the evaporating chamber to the condensing chamber, means expelling the air from said chambers, a pipe connecting said evaporation chamber and a supply reservoir of crude liquid located on the surface of the earth, said last mentioned pipe having a valve, means controlling said valve responsive to the level of crude liquid in said evaporation chamber to admit crude liquid upon fall in liquid level therein, and vice-versa, said evaporation chamber and said condensing chamber each having a plurality of liquid holding trays therein, said last mentioned pipe being adapted to feed crude liquid into said trays in said evaporation chamber, a part of said last mentioned pipe being positioned in the trays in said condensing chamber for preheating the crude liquid fed to said evaporation chamber, said evaporation chamber having a heat-absorbing coating whereby said chamber is heated at least part of the time with solar energy absorbed in said coating, and means comprising another pipe between the bottom part of said evaporation chamber and a tank for residual liquid located on the surface of the earth so that the residual liquid drops to said tank when it is concentrated through said evaporation.

3. Apparatus for continuously distilling crude liquid comprising an evaporation chamber at an elevation above the surface of the earth such that crude liquid will be raised thereto by atmospheric pressure, a condensing chamber, means comprising a pipe connecting said condensing chamber to said evaporation chamber for transferring vapor from the evaporating chamber to the condensing chamber, means expelling the air from said chambers, a pipe connection between said evaporation chamber and a supply reservoir of crude liquid located on the surface of the earth, said pipe connection having a valve, means controlling said valve responsive to the level of crude liquid in said evaporation chamber to admit crude liquid upon fall in liquid level therein, and vice-versa, said evaporation chamber having a heat-absorbing coating whereby said chamber is heated at least part of the time with solar energy absorbed in said coating, a heat shield for shielding said condensing chamber from solar heat, said heat shield having heat-reflecting means for reflecting solar heat to said evaporation chamber, another pipe connection between the bottom part of said evaporation chamber and a tank for residual liquid located on the surface of the earth so that the residual liquid drops to said tank when it is concentrated through said evaporation.

4. Apparatus for continuously distilling crude liquid comprising an evaporation chamber at an elevation above the surface of the earth such that crude liquid will be raised thereto by atmospheric pressure, a condensing chamber, means comprising a pipe connecting said condensing chamber to said evaporation chamber for transferring vapor from the evaporating chamber to the condensing chamber, means expelling the air from said chambers, a pipe connection between said evaporation chamber and a supply reservoir of crude liquid located on the surface of the earth, said pipe connection having a valve, means controlling said valve responsive to the level of crude liquid in said evaporation chamber to admit crude liquid upon fall in liquid level therein, and vice-versa, said evaporation chamber having a heat-absorbing coating whereby said chamber is heated at least part of the time with solar energy absorbed in said coating, said evaporation chamber and said condensing chamber each having a plurality of level liquid holding trays, said first mentioned pipe connection supplying crude liquid to the trays in said evaporation chamber, a pipe system having piping positioned in said trays in both of said chambers, a heat pump connected to said pipe system and a throttle device, said heat pump pumping gas out of the pipe system in said condensing chamber and compressing it into said pipe system positioned in the trays of said evaporation chamber to heat liquid therein and said throttle device allowing said compressed gas to expand into said pipe system positioned in said condensing chamber to absorb heat therefrom, another pipe connection between the bottom part of said evaporation chamber and a tank for residual liquid located on the surface of the earth so that the residual liquid drops to said tank when it is concentrated through said evaporation.

5. Apparatus for continuously distilling crude liquid comprising an evaporation chamber at an elevation above the surface of the earth such that crude liquid will be raised thereto by atmospheric pressure, a condensing chamber, means comprising a pipe connecting said condensing chamber to said evaporation chamber for transferring vapor from the evaporation chamber to the condensing chamber, means expelling the air from said chambers, a pipe connection between said evaporation chamber and a supply reservoir of crude liquid located on the surface of the earth, said pipe connection having a valve, means controlling said valve responsive to the level of crude liquid in said evaporation chamber to admit crude liquid upon fall in level therein, and vice-versa, said evaporation chamber having a heat-absorbing coating whereby said chamber is heated at least part of the time with solar energy absorbed in said coating, a manifold having a plurality of jets positioned so that liquid pumped into said manifold is sprayed over said condensing chamber, and a collecting sump positioned under said condensing chamber collecting the preheated liquid running off of said condensing chamber and a drain connected to said sump draining said sump to said crude liquid reservoir, another pipe connection between the bottom part of said evaporation chamber and a tank for residual liquid located on the surface of the earth so that the residual liquid drops to said tank when it is concentrated through said evaporation.

References Cited
UNITED STATES PATENTS

| | | | |
|---|---|---|---|
| 2,342,062 | 2/1944 | Schenk | 202—205 |
| 2,490,659 | 12/1949 | Snyder | 202—205 |
| 2,636,129 | 4/1953 | Agnew | 159—1 X |
| 2,716,446 | 8/1955 | Ross | 159—1 |
| 2,777,514 | 1/1957 | Eckstrom | 159—24 X |
| 3,232,846 | 2/1966 | Kimmerle | 202—185 |

NORMAN YUDKOFF, *Primary Examiner.*

J. SOFER, *Assistant Examiner.*